Oct. 4, 1966  S. SCHNEIDERMAN  3,276,735
POT REST
Filed Dec. 10, 1964

INVENTOR.
SOL SCHNEIDERMAN

BY *Curtis Ailes*

HIS ATTORNEY.

United States Patent Office 3,276,735
Patented Oct. 4, 1966

3,276,735
POT REST
Sol Schneiderman, 26 Maplemore Lane,
White Plains, N.Y.
Filed Dec. 10, 1964, Ser. No. 417,331
7 Claims. (Cl. 248—346)

This invention relates to supports for food vessels and particularly for cooking vessels such as pots and pans.

The term "pot" as used in this specification is intended to refer to all types of vessels which are used to contain food, usually in which foods are contained while they are being cooked. Thus, it generally includes frying pans, sauce pans, deep-dish fryers, pressure cookers, casserole dishes, and so forth. As will appear below, the invention is particularly useful for metal pots, and particularly pots of metals such as aluminum which are frequently the cause of gray marks on the porcelain surfaces of kitchen sinks.

Kitchen work surfaces such as counter tops and sinks are frequently subject to troublesome marking and defacement, and sometimes to permanent damage from cooking pots. The marking and damage sometimes arises from excessive heat from the pot, but more often it is from the black of partially oxidized grease on the bottom of the pot, or from a portion of the metal of the pot which rubs off and forms an unsightly mark. A particularly troublesome aspect of this problem involves the marking of porcelain sink surfaces by pots made of metals such as aluminum. The problem is particularly serious when the pots are being washed and scoured in the sink and moved around over the bottom surface of the sink during the course of scrubbing and scouring.

Accordingly, it is one object of the present invention to provide a pot rest which is particularly effective in protecting the surfaces of counter tops and porcelain sinks from marking or damage by a pot.

Another object of the invention is to provide a pot rest which is particularly effective in protecting the porcelain surface of the sink from marking or damage by a pot while the pot is being cleaned.

One of the problems in providing a pot rest is that it is a separate device or gadget which is simply in the way and has no other utility when it is not being used for its specific intended purpose as a pot rest.

Accordingly, it is another object of the present invention to provide a pot rest which overcomes the disadvantage of limited utility by serving as a sink stopple either concurrently with its use as a pot rest, or separately from that use.

One of the serious limitations of pot rests and protective devices for protecting working surfaces from damage by pots in the past has been that there has been no provision for support of the pot in any position other than the horizontal. The horizontal position is a useful position. However, it is also very desirable for many purposes to be able to support the pot in a stable tilted position without the necessity for the cook or his assistant to stand and hold the pot in the tilted position. The tilted position is very useful, for instance, in serving the food contained in the pot, for it is much easier to fill a serving spoon with food from a pot when the pot is tilted, because the contents of the pot roll, slide, or flow into the lower-most corner of the pot. The tilted position is also particularly convenient in serving fried foods where it is desired to have the grease drain away from the articles of food for a few minutes before they are removed from the pot.

One of the most useful purposes for which it is desirable to support a pot on a pot rest in a tilted position, however, is in scouring and cleaning the pot. It is frequently necessary for the person who is doing the pot cleaning to tilt the pot towards him so as to be able to have a good view of the interior of the pot and a naturally convenient tilted surface against which to use the scouring pad.

Accordingly, it is another object of the present invention to provide a pot rest having an improved construction which not only provides for horizontal support of the pot, but also provides for stable support of the pot in a tilted position.

It should be emphasized that the stable support of the pot in the tilted position may, in many instances, be the only reason for use of the pot rest at a particular time due to the fact that no protection of the supporting surface is actually needed. However, it should be also emphasized that the pot rest of the present invention is capable of stable support of the pot in a tilted position while at the same time affording full protection to the supporting surface, and also while acting as a sink stopple, if that function is desired. Accordingly, all three of the basic functions and objectives of this invention may be accomplished by the structure of this invention concurrently, that is: protection of the supporting surface, concurrent operation as a sink stopple, and stable support of the pot in a tilted position.

In carrying out the objectives of this invention in one preferred embodiment thereof, there may be provided a pot rest having a body of rubber-like material with a substantially flat underside. On the upper side, the body is provided with spaced integrally molded axially extending projections constructed and arranged to support a pot in either a substantially horizontal position or in a tilted position. The main body of the pot rest is thin enough to be flexible and its peripheral shape and dimensions sufficient to cover the drain of a kitchen sink whereby the pot rest may also function as a sink stopple.

Further objects and advantages of the present invention will be apparent from the following description and the accompanying drawings which are briefly described as follows.

Figure 1:
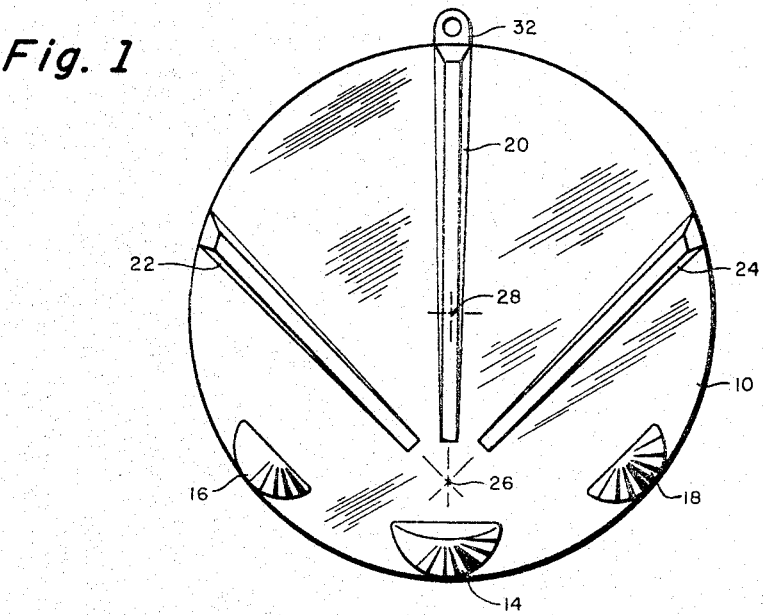
FIG. 1 is a top view of a preferred embodiment of the present invention.

Referring more particularly to the drawings, FIG. 1 shows a top view of a preferred embodiment of the invention. It is composed of a body 10 which is in the form of a disc having a flat bottom surface as illustrated at 12 in FIG. 2. On the upper surface of the body 10 there are a number of integrally molded projections extending upward in an axial direction. These projections include knob-like members 14, 16, and 18, and tapered rib members 20, 22, and 24. The tapered rib members 20, 22, and 24 all fan out from a common point indicated at 26 which is located a distance equal to about two-thirds of the radius of the disc from the center of the disc as indicated at 28. It will be understood that the points 26 and 28 are simply construction points illustrating the construction and symmetry features of this embodiment of the invention, and they are not actually marked or particularly identifiable upon the actual embodiment of the invention.

The upper surfaces of the ribs 20, 22, and 24 are tapered from a zero height nearest the origin point 26 to a maximum height at the outer periphery of the disc. This feature of the construction of these rib members is particularly illustrated in FIGS. 2 and 3, FIG. 2 being a side view of the structure of FIG. 1, and FIG. 3 being a side sectional view. As particularly shown in FIG. 2, the maximum height of the upper extremities of the projections 14, 16, and 18 is equal to the maximum height of the rib member 20 at the outer periphery of the disc body member 10. As particularly illustrated in FIG. 2, the rib member 20 cooperates with the projections 14, 16, and 18 in supporting a pot, as illustrated at 30, in a horizontal position. In respect to this function, the outer portion of the rib 20 may be considered as simply another integrally molded projection near the peripheral edge of the disc body 10 which is analogous to the projections 14, 16, and 18.

Referring back again to FIG. 1, the pot rest may be provided with an integrally molded hanger tab 32 which is conveniently provided for hanging up the pot rest on a small hook or nail when it is not in use. Alternatively, a metal hanger ring may be mounted through a small hole pierced through rib member 20.

Figure 2:
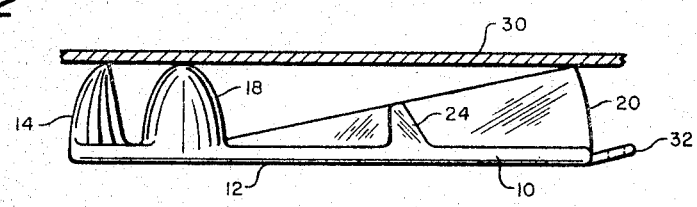
FIG. 2 is a side view of the embodiment of FIG. 1 illustrating the mode of support of a pot in a horizontal position.
Figure 3:
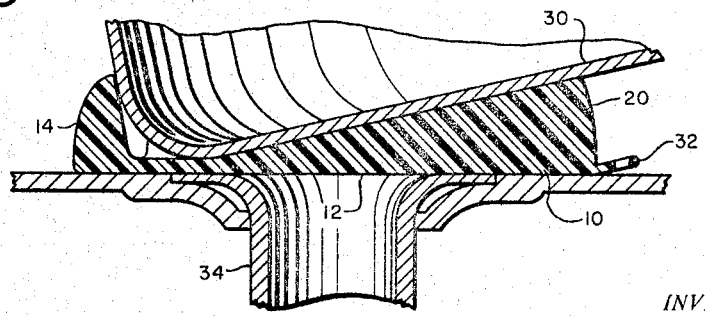
FIG. 3 is a sectional side view taken through the center axis of the embodiment of FIG. 1 and illustrating the mode of support of a pot in a tilted position, and also illustrating the utility of the device as a sink stopple.

As particularly illustrated in FIGS. 2 and 3, the tapered upper surfaces of the rib members 20–24 are all in the same plane, and may be said to define a single plane. Thus, they are particularly adapted to provide a stable tilted position of support for a pot such as illustrated by the position of the pot 30 in FIG. 3. Therefore, these rib members 20–24 are not only very decorative, as shown in FIG. 1, but they are very utilitarian as well.

As illustrated in FIG. 3, the projections 14, 16, and 18 also provide a useful function in the tilted support position of pot 30 by serving as edge positioning devices to prevent the pot which is supported in the tilted position from sliding down the tapered ribs 20–24 and thus sliding off of the pot rest. Thus, the area of convergence of the lower-most portions of the tapered ribs 20–24 and the projections 14, 16, and 18 in the vicinity of point 26 forms more or less of a notch for the corner of a pot supported in the tilted position. This "notch" also forms a sort of a non-skid rest for the corner of a pot which is being scoured if the pot is tilted up to even a sharper angle during the course of this scouring operation.

As shown in the side view of FIG. 2, the body 10 of the pot rest is provided with a smooth undersurface 12. As further illustrated in FIG. 3, this feature of construction makes the pot rest usable as a stopple for a sink drain, shown at 34 in FIG. 3. Other features of the structure which contribute to the utility of the device as a sink stopple, as well as a pot rest, are the resilient rubber-like material of which it is constructed, and the thin disc-like configuration of the body 10.

As illustrated in FIG. 1, the rib members 20, 22, and 24 are fanned out with an angle of approximately 45 degrees between each adjacent pair. This has been found to be a very practical and useful configuration, but it will be appreciated that many variations in geometry of the ribs 20–24 and the projections 14–18 are possible. Thus, the ribs may be placed at different mutual angles with relation to one another, or may be circumferentially disposed along concentric arcs with different heights thereby providing an inclined supporting surface. Furthermore, a satisfactory structure may be produced with only two tapered ribs rather than three. However, it is preferable not to use less than two ribs because at least two are required in order to have a truly stable support for a pot in the tilted position. With a two rib structure, the angle between the two ribs is preferably about 60 degrees, and they are equally spaced on either side of the center line of the body.

While no less than two ribs should be employed, it is quite obvious that more than three ribs can be employed so long as they generally conform to the pattern illustrated in FIG. 1.

Similarly, the projections 14, 16, and 18 may be revised in number and arrangement. While 16 and 18 both may be omitted, and reliance placed only on projection 14, it is preferable to have at least two of these projections in order to form a truly stable positioning action for a pot which is supported in the tilted position as illustrated in FIG. 3. With any even number of the type of projections illustrated by 14, 16, and 18, an equal number are preferably arranged on the two opposite sides of the center line of the body 10. Thus, with two of these projections, the two are preferably equally spaced on opposite sides of the center line.

The body 10 of the pot rest is illustrated in a preferred embodiment in FIG. 1 as having a circular disc shape. This shape is generally preferred, particularly where the pot rest is to be utilized not only as a pot rest but also as a sink stopple. However, it will be apparent that variations in the peripheral shape of the pot rest may be made without departing from the spirit of the present invention.

As illustrated in FIG. 2, when the pot 30 is supported in the horizontal position, it engages the projections 14, 16, and 18, and the peripheral outermost portion of the rib 20. The forces exerted by the weight of the pot 30 are thus transmitted primarily to the edges of the resilient body 10 of the pot rest. If the device is being used as a sink stopple as well as a pot rest, the weight is supported around the rim of the drain opening, and thus, solid support is available for the weight of the pot. If projections for the support of the pot were provided in the center portions of the body 10 of the pot rest, there would be a tendency for a heavy pot to push the pot rest (sink stopple) into the center of the sink drain. This would tend to place undue strain on the structure of the body 10 and could cause a rupture and breaking of the body and an end to the utility of the device as a sink stopple. Accordingly, it is preferred that the maximum axial projections of 14, 16, 18, and 20 should be positioned near the periphery of the pot rest as illustrated.

When a pot is supported in the tilted position, as illustrated in FIG. 3, the weight of the pot and its contents are distributed over the surface of the pot rest so that the difficulty mentioned above is avoided.

The pot rest of the present invention may be composed of various different rubber-like materials. Rubber itself may be employed, and various other suitable materials include, for instance, vinyls such as vinyl chloride, polyethylene, and various nylons such as polyhexamethylene adipimide. Where it is desired to accommodate very hot pots without causing any substantial deterioration of the pot rest, the pot rest may be molded of a silicone rubber which has rubber-like properties and is also very heat resistant. All of these materials mentioned in this paragraph are sometimes referred to generically below as "resilient plastic material."

From the above description, it is believed to be apparent that the invention as described and disclosed above in connection with the drawings accomplishes all of the objectives of the invention which have been set forth above. The pot rest of the invention is obviously very simple and inexpensive and yet it is very efficient in accomplishing the objective of protecting counter tops and porcelain sinks from stains and marks which are otherwise inflicted by metal cooking pots. The invention is particularly effective in solving this problem in a porcelain sink while a pot is being scoured, since the pot rest can serve as a sink stopple as well as a working pot rest during scouring of the pots. In this connection, the ribs 20–24, as well as the knobs 14–18 may be served to provide working "notches" against which the edge of a pot may be rested during scouring.

While this invention has been shown and described in connection with a single preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. A pot rest which is operable also as a sink stopple comprising a disc of resilient plastic material having a substantially smooth underside and having on the upper side at least three integrally molded axially extending projections of substantially equal height near the peripheral edge portions thereof, said pot rest also including at least two rib members on the upper side thereof and extending generally radially inwardly from the edge portions thereof, said rib members being of maximum height at the edge portions of said disc and of reduced height at the radially inwardly spaced portions thereof.

2. A pot rest comprising a disc of resilient plastic material having a flat underside and at least three projections integrally molded on the upper side thereof, at least two of said projections comprising ribs fanning out with increasing height from a central point to a maximum height at the peripheral edge portions of said disc, the upper surfaces of said ribs defining a single plane substantially inclined with respect to the bottom surface of said disc, at least one other one of said projections consisting of a knob generally positioned at the peripheral edge of said disc diametrically opposite to the position of the maximum height of the plane defined by the upper surfaces of said ribs above the bottom of said disc, at least three of said projections having the same maximum height, the height of all other projections which are provided being within the same maximum height limit as said three last-mentioned projections.

3. A pot rest comprising a disc of resilient plastic material having a flat underside and a plurality of projections integrally molded on the upper side thereof, at least three of said projections comprising ribs of tapered height fanning out from a central point which is off the center of said disc to the peripheral edge portions of said disc, said ribs each having a maximum height at said peripheral edge portions, one of said ribs being centrally located on a diametrical axis intersecting the central point of said ribs and the center of said disc, another one of said projections consisting of a knob centered on said axis at the peripheral edge portion of said disc diametrically opposite to the maximum height portion of said centrally located rib, at least two additional projection knobs at the peripheral edge portions of said disc and equally spaced on opposite sides near said last-mentioned projections having a height substantially equal to the maximum height of said central rib, and each of the others of said ribs having a smaller maximum height.

4. A pot rest which is operable also as a sink stopple comprising a thin body of resilient plastic material having a substantially flat underside and having at least three integrally molded axially extending projections near the peripheral edge portions of the upper side thereof, at least one of said projections having an inclined upper surface to provide with said remaining projections a support for a pot in a tilted position.

5. A combination pot rest and sink stopple, comprising a thin disc of resilient plastic material having a flat underside and a plurality of projections integrally molded on the upper side thereof, at least two of said projections comprising ribs fanning out from a central point toward the peripheral edge portions of said disk, said ribs each having a maximum height at said disk edge portions and a minimum height nearest said central point.

6. A pot rest operable for supporting a cooking utensil horizontally or at an inclined position, and operable, separately or while supporting a pot, as a sink stopple as well as a pot rest, and comprising a disc of resilient plastic material having a flat underside and a plurality of projections integrally molded on the upper side thereof, at least three of said projections comprising ribs fanning out with increasing height from a rib center point which is located away from the center of said disc by a dimension which is equal to approximately two-thirds of the radius of said disc, each of said ribs being terminated at its maximum height at the peripheral edge portions of said disc, the upper surfaces of said ribs defining a single plane substantially inclined with respect to the bottom surface of said disc, one of said ribs being centrally located on a diametrical axis intersecting the central point of said ribs and the center of said disc, another one of said projections consisting of a projection centered on said axis at the peripheral edge portion of said disc diametrically opposite to the position of the maximum height portion of said centrally located rib, at least two additional projections at the peripheral edge portions of said disc and equally spaced on opposite sides near said last-mentioned projection, all three of said last-mentioned projections having a height substantially equal to the maximum height of said central rib, and each of the others of said ribs having a lesser maximum height.

7. A pot rest comprising a disc of resilient plastic material having a flat underside and at least three projections integrally molded on the upper side thereof, at least two of said projections comprising ribs fanning out from a central point to the peripheral edge portions of said disc, said ribs each having a maximum height at said disc edge portions and a minimum height nearest said central point, at least said three of said projections having the same maximum height defining the maximum height of said pot rest, and the maximum height portion of the third one of said three projections being located near the peripheral edge portion of said disc.

References Cited by the Examiner
UNITED STATES PATENTS

| | | | |
|---|---|---|---|
| 1,554,837 | 9/1925 | Bock | 248—346.1 |
| 2,122,500 | 7/1938 | Sunderhauf | 248—150 |
| 2,534,137 | 12/1950 | Lewis | 161—123 |
| 3,123,835 | 3/1964 | Shernov | 4—286 |

CLAUDE A. LE ROY, *Primary Examiner.*

J. F. FOSS, *Assistant Examiner.*